United States Patent
Tsai et al.

(10) Patent No.: US 8,213,379 B2
(45) Date of Patent: Jul. 3, 2012

(54) WIRELESS STATION AND FRAME CONSTRUCTING METHOD AND FRAME READING METHOD THEREOF

(75) Inventors: Tsung-Yu Tsai, Shanhua Town, Tainan County (TW); Yi-Hsueh Tsai, Ban-Chiao (TW)

(73) Assignee: Institute for Information Industry, Taipei (TW)

( * ) Notice: Subject to any disclaimer, the term of this patent is extended or adjusted under 35 U.S.C. 154(b) by 575 days.

(21) Appl. No.: 12/437,853

(22) Filed: May 8, 2009

(65) Prior Publication Data

US 2009/0279501 A1 Nov. 12, 2009

Related U.S. Application Data

(60) Provisional application No. 61/051,748, filed on May 9, 2008.

(51) Int. Cl.
*H04W 4/00* (2009.01)
*H04B 7/208* (2006.01)

(52) U.S. Cl. .................................. 370/330; 370/344
(58) Field of Classification Search .................. None
See application file for complete search history.

(56) References Cited

U.S. PATENT DOCUMENTS

| | | | |
|---|---|---|---|
| 2006/0126553 A1* | 6/2006 | Lim et al. | 370/321 |
| 2007/0086474 A1* | 4/2007 | Lee et al. | 370/447 |
| 2008/0117962 A1* | 5/2008 | Kim et al. | 375/229 |
| 2008/0186910 A1* | 8/2008 | Cho et al. | 370/328 |

* cited by examiner

*Primary Examiner* — John Blanton
(74) *Attorney, Agent, or Firm* — Patterson Thuente Christensen Pedersen, P.A.

(57) ABSTRACT

Wireless stations and methods thereof are provided. Allocations in a frame are considered to have a predetermined transmission sequence. MAP in the frame arranges zone allocation IEs of the allocations by following the predetermined transmission sequence so that a station receive the frame can know the predetermined transmission sequence. By having the predetermined transmission sequence, zone allocation IE of each of the allocations in the frame can be described by only two parameters: number of time units and number of frequency bands.

21 Claims, 11 Drawing Sheets

WIRELESS STATION AND FRAME CONSTRUCTING METHOD AND FRAME READING METHOD THEREOF

This application claims the benefit of priority based on U.S. Ser. No. 61/051,748 filed on May 9, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a wireless station and a frame constructing method and a frame reading method thereof. More specifically, the present invention relates to a wireless station and a frame constructing method and a frame reading method thereof according to information related to the axes defining the frame.

2. Descriptions of the Related Art

In the conventional wireless networks, stations (i.e. a base station (BS), a relay station (RS), and a mobile station (MS)) are configured to transmit data according to a mapping message field defined in a frame. The aforementioned data is a plurality of bursts, or called allocations, in the frame. A station which has received the frame extracts the desired bursts according to the mapping message field in the frame. In the IEEE 802.16 standard, the MAP defined in a frame plays the role of the aforementioned mapping message field.

The mapping message field records the arrangement of the radio resource of the frame. The aforementioned radio resource includes frequency bands and time symbols (such as Orthogonal Frequency-Division Multiple Access (OFDMA) symbols in the IEEE 802.16 standard). Please refer to FIG. 1 for a schematic view of a frame 1. The frame 1 comprises a mapping message field 100 and a plurality of bursts 102, 104, 106, 108, 110, 112. The horizontal axis of the frame 1 represents time symbols, while the vertical axis of the frame 1 represents frequency band.

Conventionally, an identity of a destination station of the burst and four parameters are recorded in the mapping message field for each of the bursts 102, 104, 106, 108, 110, 112, so a station that receives the frame 1 knows the resource allocation of the burst. The four parameters are the OFDMA symbol offset, frequency band offset, the number of the OFDMA symbols (i.e. time symbols), and the number of the frequency bands. Specifically, the OFDMA symbol offset and the frequency band offset are configured to define a start of a burst, while the numbers of time symbols (i.e. the OFDMA symbols) and the number of frequency bands are configured to define a size of the burst in the frame. In other words, the four parameters can be treated as two 2D coordinates, wherein one of the 2D coordinates represents a start of a burst, while the other 2D coordinate represents a size of the burst.

For example, a start of the burst 102 of the frame 1 is defined by the 2D coordinate (OFDMA symbol offset, frequency band offset) of the point 101 in the mapping message field 100, and the size of the burst 102 is defined by the number of OFDMA symbols L1 and the number of the frequency bands W1. Thus, an identity of the destination station to receive the burst 102, the 2D coordinate of the point 101, and the 2D coordinate (L1, W1) are recorded in the mapping message field 100. Thereby, the destination station (i.e. a station whose identity is equal to the identity recorded in the mapping message field 100) can acquire the resource allocation information of the burst 102 according to the 2D coordinate of the point 101 and the 2D coordinate (L1, W1) recorded in the mapping message field 100 and then extract the burst 102 according to the resource allocation information of the burst 102.

Similarly, a start of the burst 104 is represented by the 2D coordinate (OFDMA symbol offset, frequency symbol band) of the point 103 of the burst 104 in the mapping message field 100 and the size of the burst 104 is represented by the number of OFDMA symbols L2 and the number of frequency bands W2. A start of the burst 106 is represented by the 2D coordinate (OFDMA symbol offset, frequency band offset) of the point 105 of the burst 106 in the mapping message field 100 and the size of the burst 106 is defined by the number of OFDMA symbols L3 and the number of frequency bands W3. A start of the burst 108 is represented by the 2D coordinate (OFDMA symbol offset, frequency band offset) of the point 107 of the burst 108 in the mapping message field 100 and the size of the burst 108 is represented by the number of OFDMA symbols L4 and the number of frequency bands W4. A start of the burst 110 is represented by the 2D coordinate (OFDMA symbol offset, frequency symbol offset) of the point 109 of the burst 110 in the mapping message field 100 and the size of the burst 110 is represented by the number of OFDMA symbols L5 and the number of frequency bands W5. A start of the burst 112 is represented by the 2D coordinate (OFDMA symbol offset, frequency band offset) of the point 111 of the burst 112 in the mapping message field 100 and the size of the burst 112 is represented by the number of OFDMA symbols L6 and the number of frequency bands W6. Thereby, a station can acquire the resource allocation information of the burst 104, 106, 108, 110, 112 and then extract the burst 104, 106, 108, 110, 112 according to the resource allocation information of the burst 104, 106, 108, 110, 112.

A conventional wireless network based on the IEEE 802.16 standard needs four parameters to represent the resource allocation information of each burst, which introduce extra loads in transmission and thus increases extra costs of the wireless network.

In summary, how to represent resource allocation information of each burst clearly and not increase the extra loads in transmission and the extra costs of the wireless network is still an objective for the industry to endeavor.

SUMMARY OF THE INVENTION

An objective of the present invention is to provide a wireless station that can define a predetermined transmission sequence for bursts in a frame. A mapping message field, or called MAP in the IEEE 802.16 standard, in the frame arranges zone allocation IEs of the bursts by following the predetermined transmission sequence so that a destination station receiving the frame can know the predetermined transmission sequence. The wireless station may be a base station, a relay station, or a mobile station. By having the predetermined transmission sequence, the wireless station makes resource allocation of each burst (allocation) in the frame defined by only two parameters: number of time units (e.g. OFDMA symbol offset) and number of frequency bands (e.g. subchannel offset).

To achieve the objective above, the wireless station comprises a storage module, a mapping module. The storage module is configured to store the predetermined transmission sequence for the bursts in the frame, wherein the frame is defined by a first axis and a second axis and the frame comprises the bursts and the mapping message field. The mapping module is configured to write a start of a beginning burst of the bursts and the IE of each of the bursts into the mapping message field according to the predetermined transmission sequence. In addition, each IE comprises an identity of the destination station to receive the burst and the first parameter and a second parameter of the burst, the first parameter is related to the first axis, and the second parameter is related to the second axis Another objective of the present invention is to provide a method that can define a predetermined transmission sequence for bursts (allocations) in a frame. A mapping message field (such as MAP defined in the IEEE 802.16 standard) in the frame arranges zone allocation IEs of the bursts (allocations) by following the predetermined transmission sequence so that a destination station receive the frame can know the predetermined transmission sequence. By having the predetermined transmission sequence, the method makes resource allocation of each burst (allocation) in the frame defined by only two parameters: number of time units and number of frequency bands.

The method comprises the steps of: (a) defining the predetermined transmission sequence for the bursts in the frame, wherein the frame is defined by a first axis and a second axis and the frame comprises the bursts and the mapping message field; (b) writing a start of a beginning burst of the bursts and the IE of each of the bursts into the mapping message field according to the predetermined transmission sequence. In addition, each IE comprises an identity of the destination station to receive the burst and a first parameter and a second parameter of the burst, the first parameter is related to the first axis, and the second parameter is related to the second axis.

Yet another objective of the present invention is to a wireless station. The wireless station comprises a receiving module, an information reading, a calculating module and a burst extracting module. The receiving module is configured to receive a frame from another wireless station, wherein the frame comprises a mapping message field and a plurality of bursts. The information reading module is configured to read a start of a beginning burst of the bursts and an IE of each of the bursts from the mapping message field, wherein each IE comprise an identity and a first parameter and a second parameter of the corresponding burst, the first parameter is related to the first axis and the second parameter is related to the second axis. The calculating module is configured to select the IE whose identity is equal to an identity of the wireless station as a destination IE and calculate a start of the burst for the wireless station according the start of the beginning burst and the first parameters and second parameters comprised in the IEs that are written before the destination IE. The burst extracting module is configured to extract the burst for the wireless station according to the start of the bursts and the first parameter and the second parameter comprised in the destination IE.

Yet a further objective of this invention is to provide a method. The method comprises the following steps of: (a) receiving a frame from another wireless station, wherein the frame comprises a mapping message field and a plurality of bursts; (b) reading a start of a beginning burst of the bursts and an IE of each of the bursts from the mapping message field, wherein each IE comprise an identity and a first parameter and a second parameter of the corresponding burst, the first parameter is related to the first axis and the second parameter is related to the second axis; (c) selecting the IE whose identity is equal to an identity of the wireless station as a destination IE and calculate a start of the burst for the wireless station according the start of the beginning burst and the first parameters and second parameters comprised in the IEs that are written before the destination IE; and (d) extracting the burst for the wireless station according to the start of the bursts and the first parameter and the second parameter comprised in the destination IE.

According to the present invention, bursts (allocations) in a frame are considered to have a predetermined transmission sequence. MAP in the frame arranges zone allocation IEs of the bursts by following the predetermined transmission sequence so that a station receiving the frame can know the predetermined transmission sequence. By having the predetermined transmission sequence, resource allocation of each burst (allocation) in the frame is defined by only two parameters: number of time units and number of frequency bands. Compared with the conventional technique, the frame of the present invention saves two parameters to define the resource allocation of the burst (allocation). The present invention can decrease the extra loads in transmitting and the extra costs of the wireless network effectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a frame structure so that wireless stations that adopt the Orthogonal Frequency-Division Multiple Access (OFDMA) technique can construct a frame and read a frame accordingly. Particularly, the wireless stations may adopt the IEEE 802.16 standard, and the stations within are capable of parsing the frame proposed by the present invention.

Figure 1:
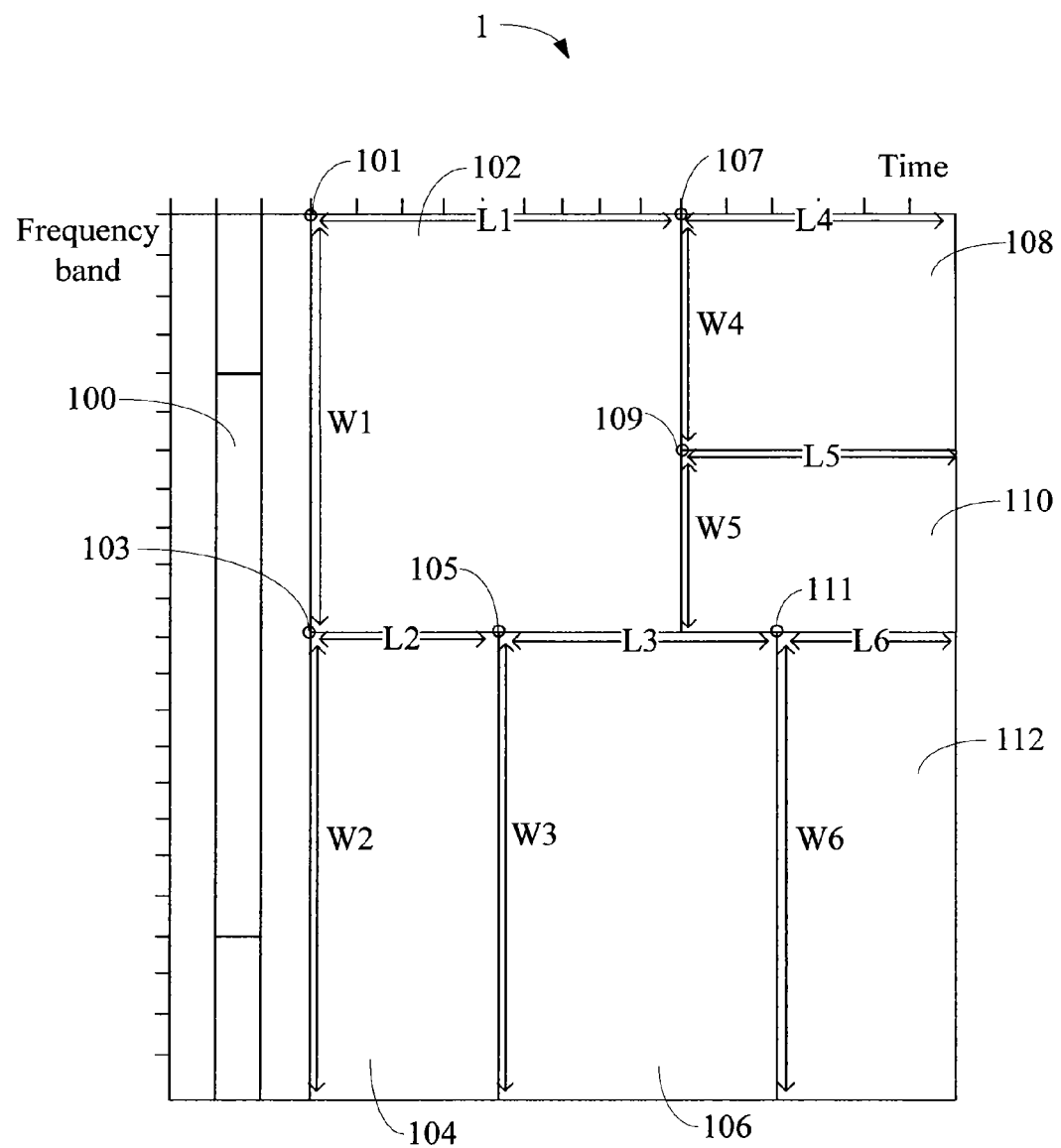
FIG. 1 is a schematic diagram of a conventional frame.
Figure 2A:
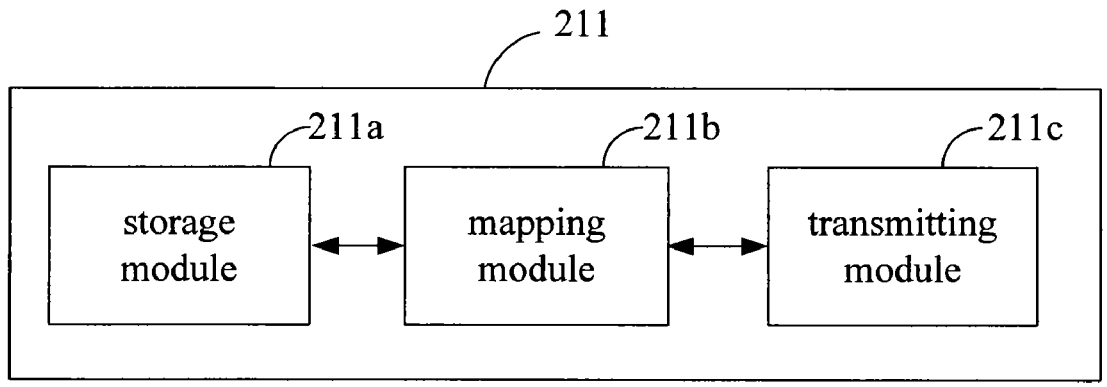
FIG. 2A illustrates a wireless station for transmission of the present invention.
Figure 2B:
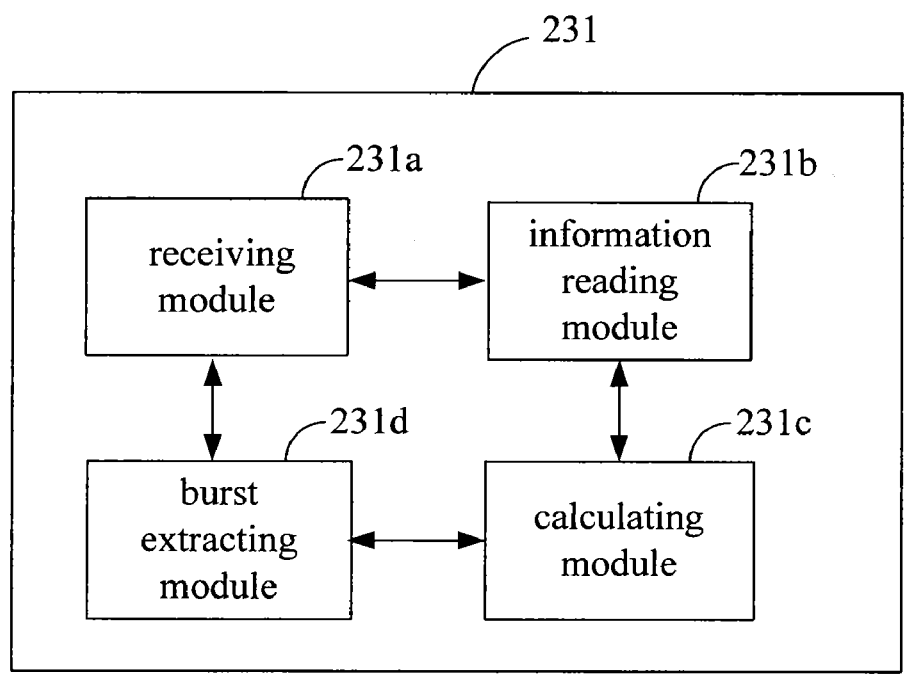
FIG. 2B illustrates a wireless station for receiving of the present invention.

FIG. 2A illustrates a wireless station that plays the transmission role (called transmission station 211 for convenience) of the present invention, while the FIG. 2B illustrates a wireless station that plays the receiving role (called destination station 213 for convenience) of the present invention. The transmission station 211 comprises a storage module 211a, a mapping module 211b, and a transmitting module 211c. The destination station 231 comprises a receiving module 231a, an information reading module 231b, a calculating module 231c, and a burst extracting module 231d. The following embodiments will be described with reference to the transmission station 211 and the destination station 231. The transmission station 211 and the destination station 231 agree to a predetermined transmission sequence, which will be described later.

Figure 3A:
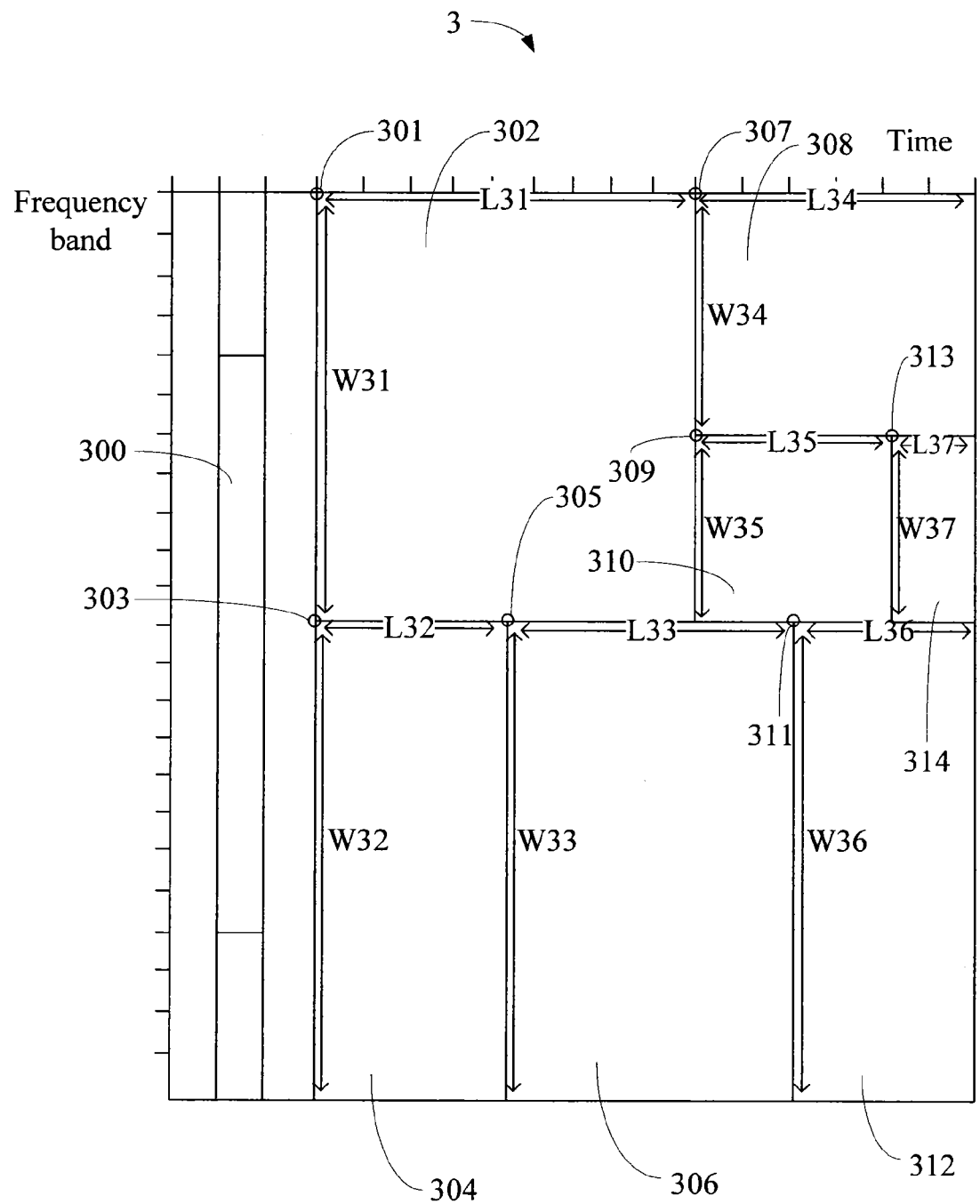
FIG. 3A is a schematic diagram of a frame constructed by a first embodiment.

FIG. 3A is a schematic view of a frame 3 constructed by a first embodiment of the present invention. The first embodiment can be realized by the transmission station 211. In the first embodiment, the frame is defined by a first axis (i.e. the horizontal axis) and a second axis (i.e. the vertical axis). It is assumed that the first embodiment conforms to the IEEE 802.16 standard, so the first axis of the frame 3 represents time symbols (i.e. OFDMA symbols) and the second axis of the frame 3 represents frequency bands.

The frame 3 comprises a mapping message field 300 and a plurality of bursts 302, 304, 306, 308, 310, 312, 314. Each of the bursts 302, 304, 306, 308, 310, 312, 314 is defined by a 2D coordinate indicating a beginning position of the burst, wherein each of the 2D coordinates comprises a first coordinate value related to the first axis and a second coordinate related to the second axis. Specifically, the bursts 302, 304, 306, 308, 310, 312, 314 respectively begin at the beginning positions 301, 303, 305, 307, 309, 311, 313. Thus, the bursts 302, 304, 306, 308, 310, 312, 314 are respectively represented by the 2D coordinates of the beginning positions 301, 303, 305, 307, 309, 311, 313.

The mapping message field 300 is configured to indicate the resource allocation of each of the bursts 302, 304, 306, 308, 310, 312, 314. Since the first embodiment conforms to the IEEE 802.16 standard, the mapping message field 300 is the MAP defined in the IEEE 802.16 standard. The mapping module 211b writes a start of a beginning burst of the bursts 302, 304, 306, 308, 310, 312, 314 into the mapping message field 300. Then, the mapping module 211b writes an information element (such as a zone allocation information elements in the IEEE 802.16 standard) of each of the bursts 302, 304, 306, 308, 310, 312, 314 in the frame 3 according to the predetermined transmission sequence stored in the storage module 211a. Therefore, the destination station that receives the frame 3 is able to know the resource allocation information of the bursts from the IEs. The details of processing the mapping message field 300 are explained in the following paragraphs.

In this embodiment, the beginning burst is the burst 302, so the start of the beginning burst is the beginning position 201. The start of the beginning burst (i.e. the burst 302) is defined by a first parameter and a second parameter of the beginning burst, wherein the first parameter of the beginning burst is related to the horizontal axis, and the second parameter of the beginning burst is related to the vertical axis. Since the first embodiment conforms to the IEEE 802.16 standard, the first parameter defining the start is an OFDMA symbol offset and the second parameter defining the start is a frequency band offset. As shown in FIG. 3A, the first and second parameters of the beginning burst (i.e. the burst 302) is (0, 0).

The first embodiment may derive the predetermined transmission sequence according to the 2D coordinates indicating the beginning positions 301, 303, 305, 307, 309, 311, 313 of the burst 302, 304, 306, 308, 310, 312, 314. Each of the 2D coordinates comprises a first coordinate value related to the first axis (such as the axis representing time symbols) and a second coordinate value related to the second axis (such as the axis representing frequency bands). The predetermined sequence may be determined by arranging the first bursts 302, 304, 306, 308, 310, 312, 314 by ordering the first coordinate value first and then ordering the second coordinates. For example, if the first coordinate value (i.e. time-coordinate) of a particular location (such as the beginning position) of a burst is smaller, its sequence number in the predetermined transmission sequence is smaller. Similarly, if the second coordinate value (i.e., frequency-coordinate) of a particular location (such as the beginning position) of the burst is smaller, its sequence number in the predetermined transmission sequence is smaller too. In addition to a beginning position, the particular location may also be an ending position, a center, or any other location of the burst.

Figure 3B:
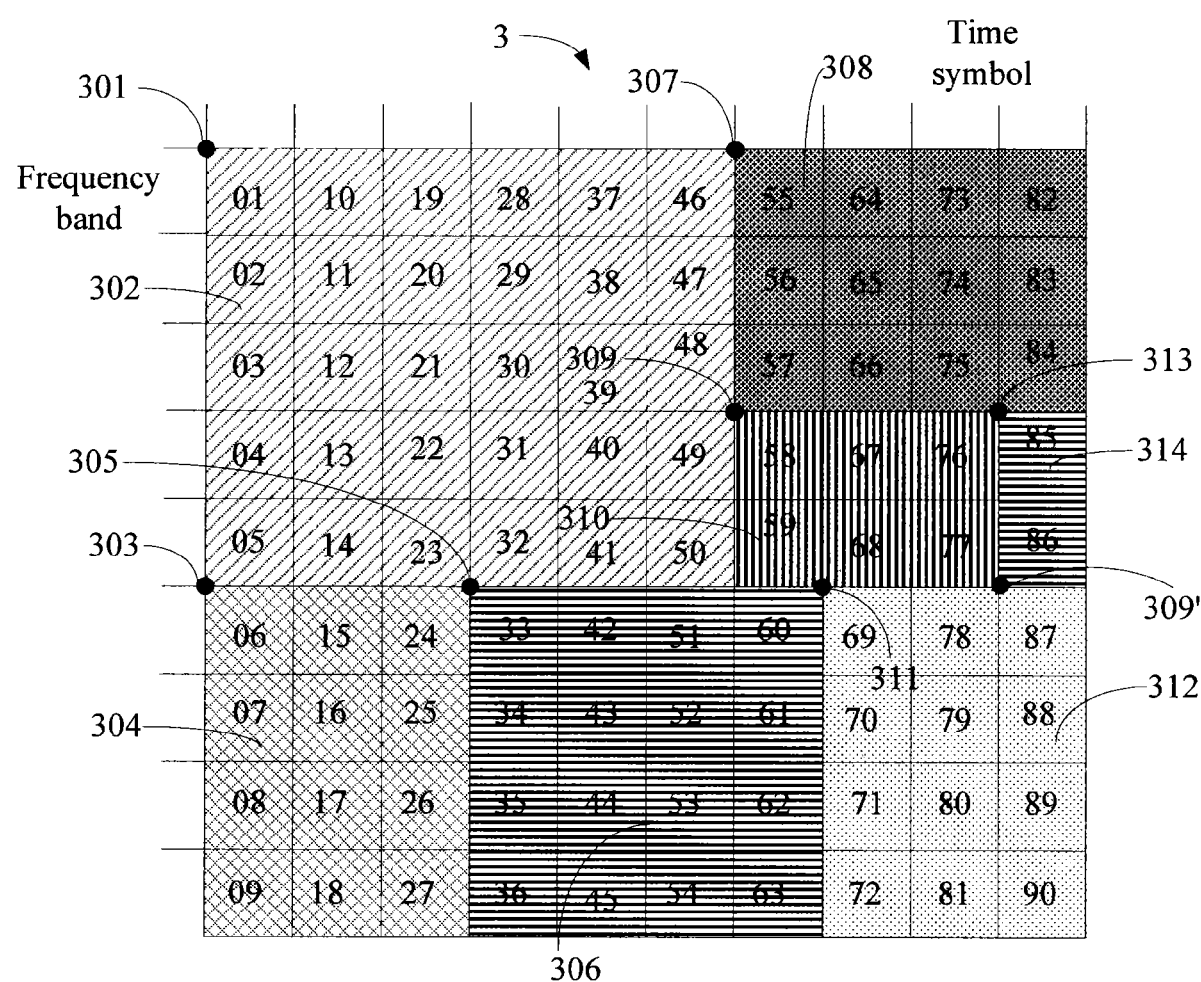
FIG. 3B is a coordinate diagram corresponding to the frame constructed by the first embodiment.

In this embodiment, the predetermined transmission sequence is derived by ordering the first coordinates values (i.e. the time-coordinates) of the beginning positions 301, 303, 305, 307, 309, 311, 313 first and ordering the second coordinates values (i.e. the frequency-coordinate), so the predetermined transmission sequence is burst 302, burst 304, burst 306, burst 308, burst 310, burst 312, and burst 314. The idea may be visualized by FIG. 3B, which is a close look of the bursts 302, 304, 306, 308, 310, 312, 314 in the frame 3. The bursts 302, 304, 306, 308, 310, 312, 314 comprise 90 grids 01-90. Each of the grids 01-90 may comprise at least one time symbols and at least one frequency band. The numbers of the time symbols and the numbers of the frequency bands comprised in each of the grids 01-90 are the same. Each of the grids 01-90 is assigned a unique number by converting the 2D coordinate into the unique number in a one-on-one fashion. By visualizing the frame 3 as the grids 01-90, the predetermined transmission sequence may be determined according to the unique numbers of the left-top grids 01, 06, 33, 55, 58, 69, 85 of the bursts 302, 304, 306, 308, 310, 312, 314. Therefore, the predetermined transmission sequence is bursts 302, 304, 306, 308, 310, 312, 314. Alternatively, the first embodiment may derive the predetermined transmission sequence by ordering the first coordinate values firstly and ordering the second coordinate values secondly, then the predetermines transmission sequence will be the bursts 302, 308, 310, 314, 304, 306, 312. It is emphasized that the first embodiment may map the 2D coordinates representing the bursts into 1D sequence numbers in a one-on-one fashion in order to derive the predetermined transmission sequence. The aforementioned method to determine the sequence number in the predetermined transmission sequence is not used to limit the scope of the present invention.

Now, the IEs (describing the locations of the bursts 302, 304, 306, 308, 310, 312, 314) and their contents are described. Since the predetermined transmission sequence is burst 302, 304, 306, 308, 310, 312, 314, the mapping module 211b writes IEs of the bursts 302, 304, 306, 308, 310, 312, 314 into the mapping message field 300 according to this predetermined transmission sequence. That is, after the start of the beginning burst (i.e. the burst 302), the IE of the burst 302 occurs in the mapping message field 300, and then the IE of the burst 304, the IE of the burst 306, the IE of the burst 308, the IE of the burst 310, the IE of the burst 312, and the IE of the burst 314 occur in sequence.

Each information element of the bursts 302, 304, 306, 308, 310, 312, 314 comprises an identity of a destination station to receive the burst and a first parameter and a second parameter of the burst, wherein the first and second parameters are respectively related to the first and second axes of the burst. Specifically, the content of the IE of the burst 302 is (CID1, L31, W31), where CID1 represents the identity of a destination station (i.e. the connection identification in the IEEE 802.16 standard) to receive the burst 302, the first parameter L31 represents the number of the OFDMA symbols occupied by the burst 302, and the second parameter W31 represents the number of the frequency bands occupied by the burst 302. The CID is well-known to those in the art and not described again. Similarly, the contents of the zone allocation IEs of the burst 304, 306, 308, 310, 312, 314 are respectively (CID2, L32, W32), (CID3, L33, W33), (CID4, L34, W34), (CID5, L35, W35), (CID6, L36, W36), and (CID7, L37, W37). Similarly, CID2, CID3, CID4, CID5, CID6, CID7 respectively represent the identities of the destination stations (such as the connection identification) to receive the burst 302, 304, 306, 308, 310, 312, 314. The first parameters L32, L33, L34, L35, L36, L37 respectively represent the number of OFDMA symbols occupied by the bursts 302, 304, 306, 308, 310, 312, 314. The second parameters W32, W33, W34, W35, W36, W37 respectively represent the number of frequency bands occupied by the burst 302, 304, 306, 308, 310, 312, 314. After the IEs of the bursts 302, 304, 306, 308, 310, 312, 314 are written into the mapping message field 300, the transmitting module 211c is able to transmit the frame 3.

It is noted that in other embodiments, the first parameter and the second parameter of an IE can be replaced by an ending position of the burst. For example, the first parameter L37 and the second parameter W37 represents the ending position of the burst 314.

According to the aforementioned description, the information element (i.e. resource allocation) in the mapping message field 300 of each of the bursts 302, 304, 306, 308, 310, 312, 314 is defined by only two parameters. As a result, the transmission time of the frame 3 can be reduced.

Assume that the destination station 231 intends to receive the burst 302. The receiving module 231a receives the frame 3 and the information read module 231b reads the mapping message field 300. After reading the mapping message field 300, the destination station knows the start of the beginning burst (i.e. burst 302) of the frame. The calculating module 231b recognizes that the CID1 comprised in the IE (CID1, L31, W31) is equal to its identity, so the calculating module 231c selects IE (CID1, L31, W31) as the destination IE. Then, the calculating module 231c calculates the start 302 of the burst 302 according to the start of the beginning burst (i.e. burst 302) and the first parameters and the second parameters that are written before the destination IE. In this case, the destination IE is the first IE, so the start of the burst 302 is the start of the beginning burst, which is the beginning position 301. Afterwards, the burst extracting module 231d is able to extract the burst 302 according to the start of the burst 302 and the first parameter L31 and the second parameter W31 comprised in the destination IE.

Similarly, if the burst 304 is to be received by the destination station 231, the IE of the burst 304 comprises the identity of the destination station 231. The information reading module 231b also reads the mapping message field 302 at first. The calculating module 231c recognizes the CID2 in the IE (CID2, L32, W32) is equal to the identity of the destination station 231, so the IE (CID2, L32, W32) is the destination IE. The calculating module 231c calculates the start of the burst 304 according to the start of the beginning burst 302, the first parameter L31, and the second parameter W31 that are written before the destination IE (CID2, L32, W32) based on the predetermined transmission sequence. Specifically, the calculating module 231c knows that the burst 302 occupies the grids 01-05, 10-14, 19-23, 28-32, 37-41, 46-50 by calculation. Then, according to the predetermined transmission sequence (ordering the first coordinate value firstly and ordering the second coordinate value secondly), the start of the burst 304 is the grid 06 (i.e. the beginning position 303). The start of the burst 304 is a position whose first coordinate value is the smallest one (i.e. 0) among the unoccupied grid and whose second coordinate value is the smallest one (i.e. 5) among the unoccupied grids with first coordinate being 0 (i.e. (0, 5), (0, 6), (0, 7), and (0, 8)).

Note that the first and second parameters that respectively represent the number of the OFDMA symbols and the number of the frequency bands of each IE of the bursts can be replaced by a 2D coordinate indicating an ending position of the corresponding burst. People skilled in this field can easily know that the number of the OFDMA symbols and the number of the frequency bands of each IE of the bursts can be calculated using the two 2D coordinate indicating the start and the end position of the corresponding burst, respectively. For example, as for the burst 310, the two first parameter L35 and the second parameter W35 of the IE (CID5, L35, W35) can be replace by the coordinate 309' so that L35 and W35 can be calculated using the coordinates 309 and 309'.

Similarly, destination stations that intends to receive the burst 306, 308, 310, 312, 314 can respectively calculates the start 305 of the burst 306, the start 307 of the burst 308, the start 309 the burst 310, the start 311 the burst 312, and the start 313 the burst 314 according to the start of the beginning burst (i.e. the burst 302) as well as the first and second parameters of the preceding IEs (i.e. the number of OFDMA symbols and the number of frequency bands occupied by the corresponding preceding bursts). More specifically, the start 305 of the burst 306 is grid 33, the start 307 of the burst 308 is grid 55, the start 309 the burst 310 is grid 58, the start 311 the of burst 312 is grid 69, and the start 313 the burst 314 is grid 85.

According to the IE of the burst 304, a destination station knows that the burst 304 occupies the grids 06-09, 15-18, 24-27. Likewise, a destination station knows that the burst 306 occupies grids 33-36, 42-45, 51-54, 60-63 according to the IE of the burst 306. A destination station knows that the burst 308 occupies the grids 55-57, 64-66, 73-75, 82-84 according to the IE of the burst 308. A destination station knows that the burst 310 occupies the grids 58, 59, 67, 68, 76, 77 according to the IE of the burst 310. A destination station knows that the burst 312 occupies the grids 69-72, 78-81, 87-90 according to the IE of the burst 312. A destination station knows that the burst 314 occupies the grids 85, 86 according to the IE of the burst 314.

In this way, the resource allocation of each burst in the frame is defined by only two parameters: number of OFMDA symbols and number of frequency bands in the mapping message field. Compared with the conventional technique, the frame of the present invention saves two parameters to define the resource allocation of the burst.

Figure 4:
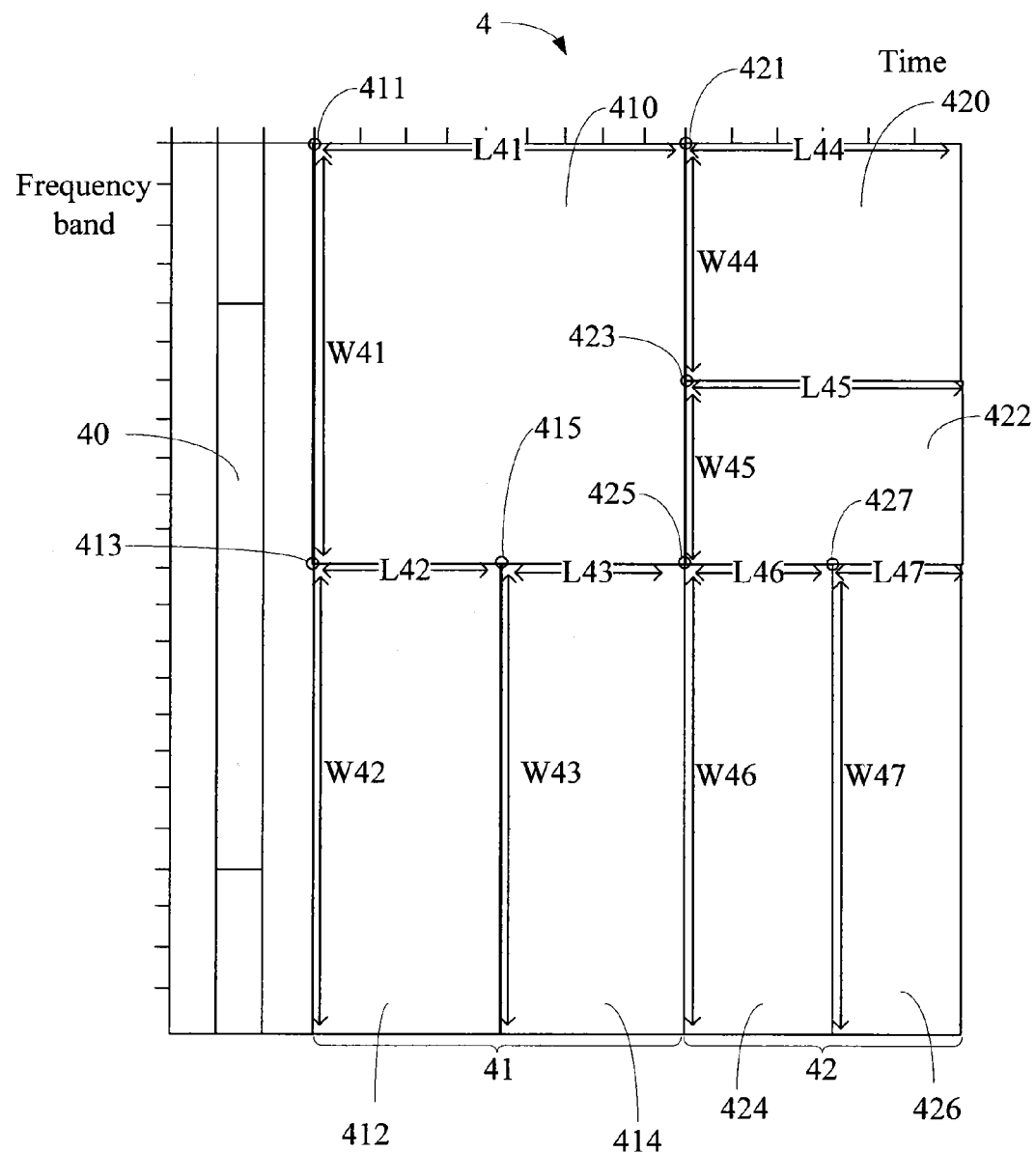
FIG. 4 is a schematic diagram of a frame constructed by a second embodiment.

FIG. 4 illustrates a schematic view of a frame 4 constructed by a second embodiment of the present invention. The second embodiment can be realized by the transmission station 211. The first axis (i.e. the horizontal axis) of the frame 4 represents OFDMA symbols, while the second axis (i.e. the vertical axis) of the frame 3 represents frequency band. Similar to the frame 3 in the first embodiment, the resource allocation of each burst in the frame 2 may be represented as a 2D coordinate. The frame 4 and the frame 3 are constructed in the similar approaches, so the following descriptions will be focused on the differences between them.

The frame 4 comprises a mapping message field 40 and two zones (i.e. first zone 41 and second zone 42), wherein the first zone 41 and the second zone 42 may have different physical configurations. Compared with the frame 3 in the first embodiment, the frame 4 is divided into first zone 41 and the second zone 42. The first zone 41 comprises a plurality of first burst 410, 412, 414. The second zone 42 comprises a plurality of second burst 420, 422, 424, 426.

In this embodiment, the predetermined transmission sequence is from the first zone 41 to the second zone 42. The predetermined transmission sequence in the first zone 41 is from the burst 410, the burst 412, to the burst 414. The predetermined transmission sequence in the second zone 42 is from the burst 420, the burst 422, the burst 424, to the burst 426. Therefore, the mapping module 211*b* writes a zone information element (zone IE) of the first zone 41 into the mapping message field 40 firstly, writes the start of the beginning burst 410 of the first bursts 410, 412, 414 comprised in the first zone 41 into the mapping message field 40 secondly, writes the IEs of the bursts 410, 412, 414 in to the mapping message field 40 thirdly, writes the zone IE of second zone 42 into the mapping message field 40 fourthly, writes the start of the beginning burst 420 of the second bursts 420, 422, 424, 426 comprised in the second zone 42 into the mapping message field 40 fifthly, and writes the IEs of the bursts 420, 422, 424, 426 into the mapping message field 40 sixthly.

The content of the IEs for the first bursts 410, 412, 414 and the second bursts 420, 422, 424, 426 in the frame 4 are similar to the IEs defined in the first embodiment. The content of the IE of the first burst 410 is (CID1, L41, W41), where CID1 is an identity of a destination station of the first burst 410, the first parameter L41 is the number of the OFDMA symbols occupied by the first burst 410, the second parameter W41 is the number of the frequency bands occupied by the first burst 410. Similarly, the content of the IEs of the first burst 412, the first burst 414, the second burst 420, the second burst 422, the second burst 424, and the second burst 426 are (CID2, L42, W42), (CID3, L43, W43), (CID4, L44, W44), (CID5, L45, W45), (CID6, L46, W46), and (CID7, L47, W47), respectively.

Similar to the first embodiment, a destination station can extract its burst according to the information written in the mapping message field 40. For example, the destination station to receive the first burst 410 calculates the start of the burst 410 according to the zone IE of the first zone 41, the start of the beginning burst 410 of the first zone 41, and the IEs that are written before the IE of the first burst 410. Similarly, a destination station can know the start 413 of the burst 412 according to the zone IE of the first zone 41, the start of the beginning burst 410 of the first zone 41, and the first parameter L41 and the second parameter W41 written before the IE of the first burst 412 (i.e. (CID2, L42, W42)). Similarly, the start 415 of the burst 414 can be calculated according to zone IE of the first zone 41, the start of the beginning burst 410 of the first zone 41 the start of the beginning burst 410 of the first zone 41, and the first parameters L41, L42, and the second parameters W41, W42.

It works in the similar way for the second bursts 420, 422, 424, 426 of the zone 42. The destination station parses the zone IE of the zone 42 indicated in the mapping message field 40 to acquire the size of the second zone 42. The destination station also knows the start 421 of the beginning burst 420 in the second zone 42. Thereafter, starts of the second bursts 420, 422, 424, 426 can be calculated in the similar approach. For example, the destination station can calculate the start 423 of the second burst 424 according to the zone IE of the second zone 42, the start 421 of the beginning burst 420 of the second zone 42, the first parameter L44, and the second parameter W44. The destination can calculate the start 425 of the burst 424 according to the zone IE of the second zone 42, the start 423 of the beginning burst 420 in the second zone 42, the first parameters L44, L45, and the second parameters L45, W45. The destination station can calculate the start 427 of the burst 426 according to the zone IE of the second zone 42, the start 421 of the second zone 42, the first parameters L44, L45, L46, and the second parameters W44, W45, W46. The destination station can further know the resource allocations of the second bursts 422, the burst 424, the burst 426 according to the IEs (CID 5, L45, W45), (CID 6, L46, W46), and (CID 7, L47, W47).

In this way, the resource allocation of each burst in the frame is defined by only two parameters: a first parameter related to the first axis and a second parameter related to the second axis. Specifically, the first parameter is the number of OFDMA symbols and the second parameter is the number of frequency bands in the IEEE 802.16 standard. Compared with the conventional technique, the frame of the present invention saves two parameters to define the resource allocation of the burst.

Figure 5:
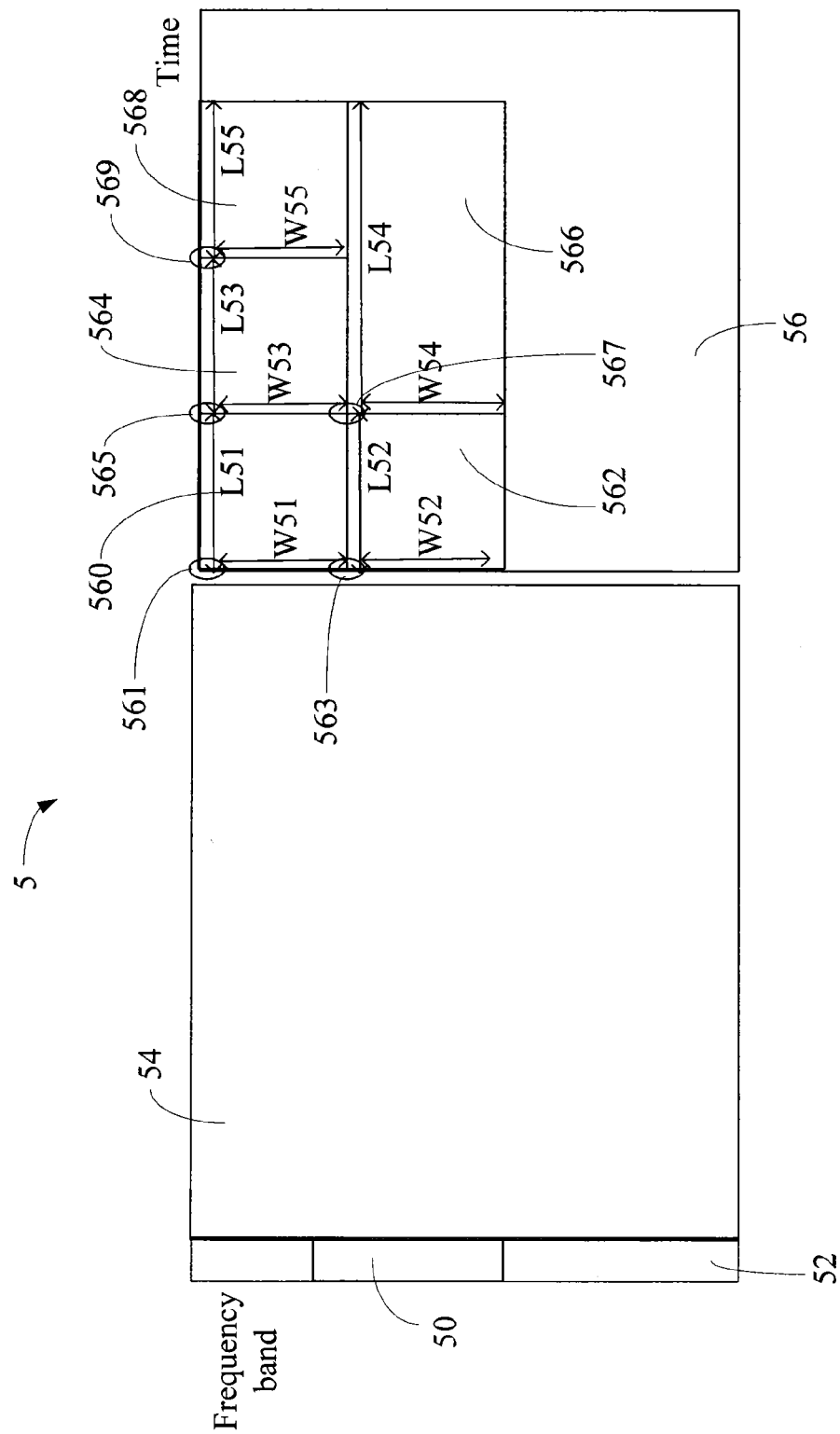
FIG. 5 is a schematic diagram of a frame constructed by a third embodiment.

FIG. 5 illustrates a schematic view of a frame 5 constructed by a third embodiment of the present invention. The third embodiment can be realized by the transmission station 211. In the third embodiment, the frame 5 is defined by a first axis (i.e. the horizontal axis) and a second axis (i.e. the vertical axis). The third embodiment conforms to the IEEE 802.16e standard, so the first axis represents time symbols (i.e. OFDMA symbols) and the second axis represents frequency bands. Similar to the frame 2 in the first embodiment, the resource allocation of each burst in the frame 5 is represented as a 2D coordinate.

In this embodiment, the frame 5 comprises two mapping message fields (i.e. a downlink (DL) MAP 50 and an uplink (UL) MAP 52), a DL subframe 54, and an UL subframe 56. The mapping of the DL subframe 54 indicated in the DL MAP 50 can be interpreted by the similar way as the mapping of frame 3 indicated in the mapping message field 300 in the first embodiment. Likewise, the mapping of the UL subframe 56 indicated in the UL-MAP 52 can be interpreted by the similar way as that the mapping of the frame 3 indicated in the mapping message field 300 in the first embodiment. Herein, the UL-MAP 52 and the UL subframe 56 are described, while the DL-MAP 50 and the DL subframe 54 are skipped.

In this embodiment, the UL-MAP 52 is configured to indicate the resource allocation of the bursts 560, 562, 564, 566, 568 in the UL subframe 56. More particularly, when the third embodiment conforms to the IEEE 802.16e standard, each of the bursts 560, 562, 564, 566, 568 can be used for a fast feedback, HARQ, ACKCH region, CDMA ranging, BR allocations, or PAPR/Safety zone.

In this embodiment, the predetermined transmission sequence is the burst 560, 562, 564, 566, and then 568. Similarly, the mapping module 211*b* of the transmission station 211 writes a start of the beginning burst of the bursts 560, 562, 564, 566, 568 into the UL-MAP 52. Then, the mapping module 211*b* writes an information element (IE) for each of the bursts 560, 562, 564, 566, 568 into the UL-MAP 52 according to the predetermined transmission sequence agreed by both the transmission station 211 and the destination station. The destination station that receives the UL subframe 56 can calculate the start of the burst for the destination and then extract the burst according to the information written in the UL-MAP 52.

The content of the IE for the burst 560 is (CID1, L51, W51), where CID1 is the identity of a destination station to receive the burst 560, the first parameter L51 is the number of the OFDMA symbols occupied by the burst 560, and the second parameter W51 is the number of the frequency bands occupied by the burst 560. Similarly, the content of the IEs for the burst 562, 564, 566, 568 are (CID2, L52, W52), (CID3, L53, W53), (CID4, L54, W54), and (CID5, L55, W55), respectively. The identities CID2, CID3, CID4, and CID5 are the identities of destination stations to receive the burst 562, 564, 566, 568, respectively. The first parameters L52, L53, L54, and L55 are the numbers of the OFDMA symbols occupied by the burst 462, 464, 466, 468, respectively. The second parameters W52, W53, W54, and W55 are the numbers of the frequency bands occupied by the burst 562, 564, 566, 568, respectively. Destination stations that intend to receive the burst 560, 562, 564, 566, 568 can calculate the start 561, 563, 565, 567, 569 in the same way as described in the above embodiments.

In this way, the resource allocation of each burst in the frame is defined by only two parameters: number of OFDMA symbols and number of frequency bands in the UL-MAP. Compared with the conventional technique, the frame of the present invention saves two parameters to define the resource allocation of the burst.

Figure 6:
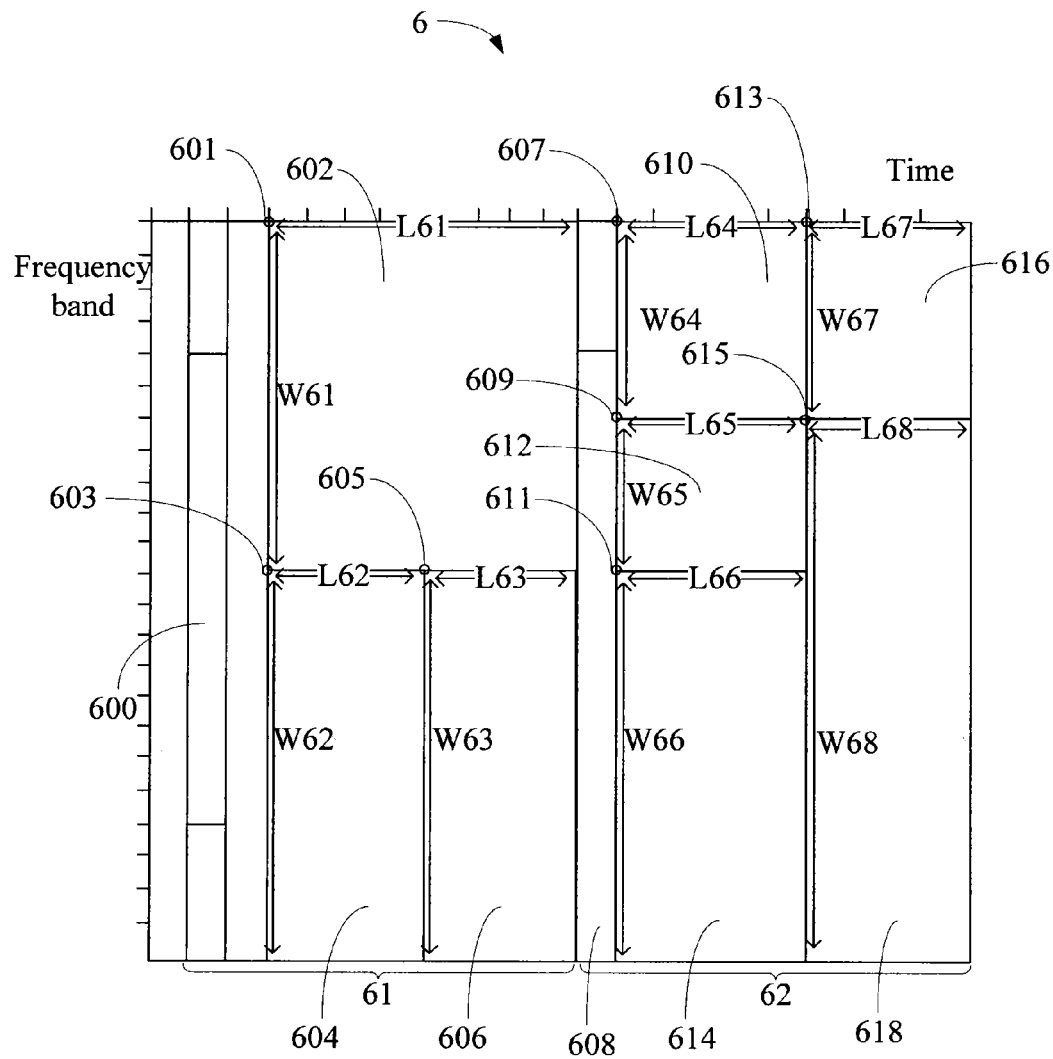
FIG. 6 is a schematic diagram of a frame constructed by a fourth embodiment.

FIG. 6 illustrates a schematic view of a frame 6 constructed by a fourth embodiment of the present invention in a non-transparent wireless network. In the fourth embodiment, the frame 6 is defined by a first axis (i.e. the horizontal axis of the frame 6) and a second axis (i.e. the vertical axis). The fourth embodiment conforms to the IEEE 802.16 standard, so the first axis represents time symbols, such as OFDMA symbols and the vertical axis of the frame 6 represents frequency bands. Similar to the frame 3 in the first embodiment, the resource allocation of each burst in the frame 6 is represented as a 2D coordinate.

The frame 6 comprises a DL access zone 61 and a DL relay zone 62. The DL access zone 61 comprises a DL-MAP 600 and a plurality of bursts 602, 604, 606. The DL relay zone 62 comprises an R-MAP 608 and a plurality of bursts 610, 612, 614, 616, 618. The DL access zone 61 is generated by a base station, while the DL relay zone 62 is generated by a relay station. Both the base station and the relay station may be related by a station like the transmission station 211.

The base station that generates the DL access zone 61, the relay station that generates the DL relay zone 62, and the destination stations that receive the bursts 602, 604, 606, 610, 612, 614, 616, 618 agree to a predetermined transmission sequence.

The part of the DL access zone 61 is firstly described. The mapping module of the base station writes the start of the beginning burst (i.e. the burst 602) and the range of allocated region into the DL-MAP 600. In this embodiment, the predetermined transmission sequence is the burst 602, the burst 604, and then the burst 606. According to the predetermined transmission sequence, the mapping module of the base station writes the IEs of the burst 602, burst 604, and burst 606 into the DL-MAP 600.

Specifically, the content of the IE of the burst 602 is (CID1, L61, W61), where CID1 is an identity of a destination station to receive the burst 602, the first parameter L61 is the number of the OFDMA symbols occupied by the burst 602, and the second parameter W61 is the number of the frequency bands occupied by the burst 602. Similarly, the contents of the IEs for the burst 604, 606 are (CID2, L62, W62) and (CID3, L63, W63), respectively. The parameters CID2 and CID3 are the identities of the destination station to receive the burst 604, 606, respectively. The first parameters L62 and L63 are the numbers of the OFDMA symbols occupied by the burst 604, 606, respectively. The second parameters W62 and W63 are the numbers of the frequency bands occupied by the bursts 604, 606, respectively.

Destination stations that intend to receive the burst 602, 604, 606 can calculate the start 601, 603, 605 according to the information written in the DL-MAP 600 in the same way as described in the above embodiments. After the calculation of the 601, 603, 605, the destination station can extract the burst 602 according to the start 601 of the burst 602 and the IE (CID1, L61, W61). Similarly, the destination can extract the burst 604 according to the start 603 of the burst 604 and the IE (CID2, L62, W62). The destination station can extract the burst 606 according to the start 605 of the burst 606 and the IE (CID 3, L63, W63).

Now, the part of the DL relay zone 62 is described. The mapping module of the relay station writes the start 607 of the beginning burst (i.e. the burst 610) into the R-MAP 608. In this embodiment, the predetermined transmission sequence for the DL relay zone 62 is the burst 610, 612, 614, 616, and then 618. The mapping module of the relay station further writes IEs of the bursts 610, 612, 614, 616, 618 into the R-MAP 608 according to the predetermined transmission sequence.

Specifically, the content of the IE for the burst 610 is (CID4, L64, W64), where CID4 is the identity of the destination station to receive the burst 610, the first parameter L64 is the number of the OFDMA symbols occupied by the burst 610, and the second parameter W64 is the number of the frequency bands occupied by the burst 610. The CID is well-known to those in the art and not described again. Similarly, the content of the IEs for the burst 612, 614, 616, 618 are (CID5, L65, W65), (CID6, L66, W66), (CID7, L67, W67), and (CID8, L68, W68), respectively. The parameters CID5, CID6, CID7, and CID8 are the identities of the destination station to receive the burst 512, 514, 516, 518, respectively. The first parameters L65, L66, L67, and L68 are the numbers of the OFDMA symbols occupied by the burst 612, 614, 616, 618, respectively. The second parameters W65, W66, W67, and W68 are the numbers of the frequency bands occupied by the burst 612, 614, 616, 618, respectively.

Destination stations that intend to receive the burst 610, 612, 614, 616, 618 can calculate the start 607, 609, 611, 613, 615 according to the information written in the R-MAP 508 in the same way as described in the above embodiments. Thereafter, the destination station can extract the burst 610 according to the start 607 and the (CID4, L64, W64). The burst 612 can be extracted according to the start 609 of the burst 612 and (CID5, L65, W65). The burst 614 can be extracted according to the start 611 and (CID 6, L66, W66). The bursts 616, 618 can be extracted in the same fashion.

In this way, the resource allocation of each burst in the frame is defined by only two parameters: number of OFDMA symbols and number of frequency bands in the DL-MAP and R-MAP. Compared with the conventional technique, the frame of the present invention saves two parameters to define the resource allocation of the burst.

Figure 7:
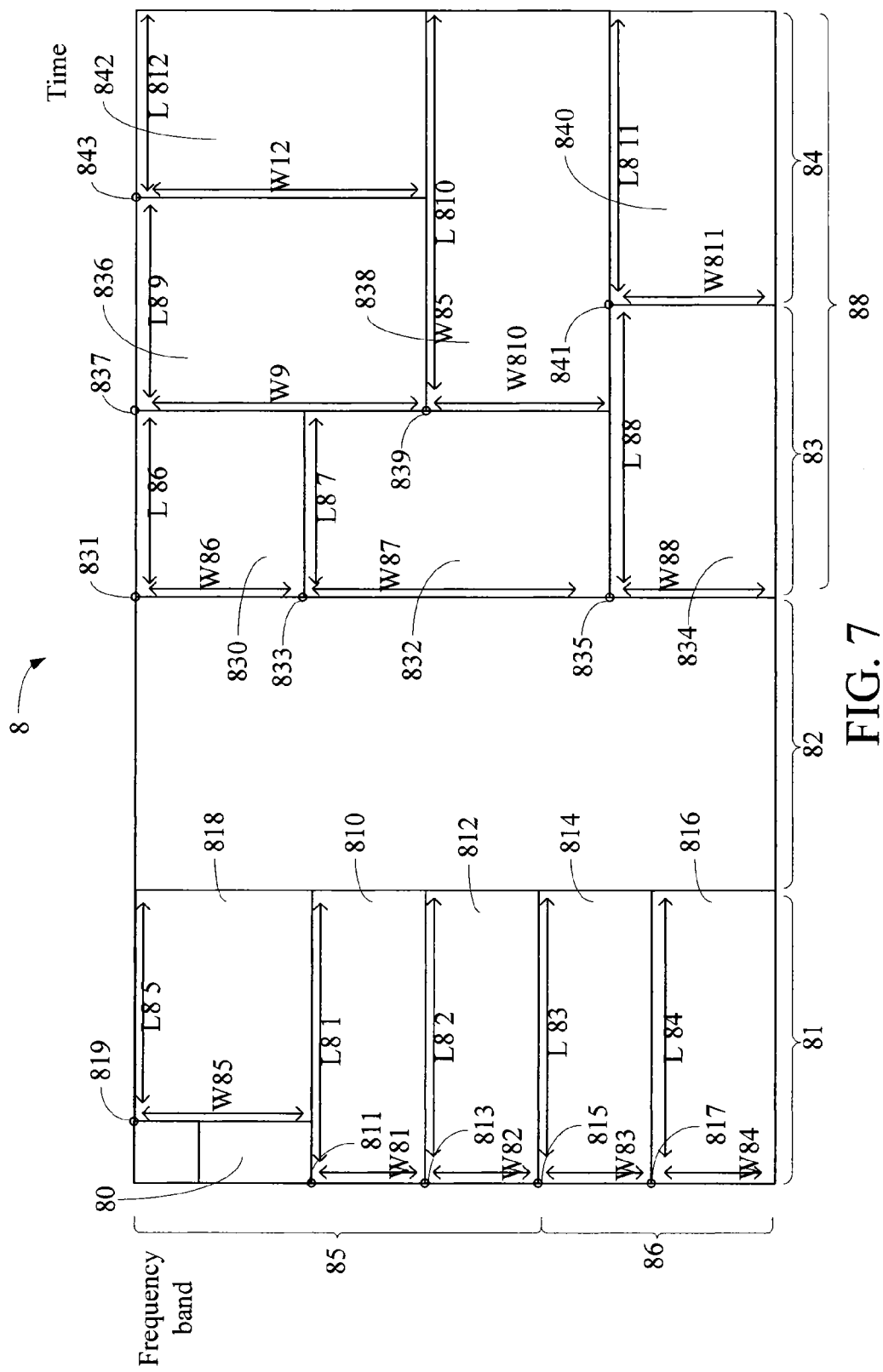
FIG. 7 is a schematic diagram of a frame constructed by a fifth embodiment.

FIG. 7 illustrates a schematic view of a region (i.e. a frame) 8 constructed by a fifth embodiment of the present invention in a communication system. The second embodiment can be realized by the transmission station 211. The first axis (i.e. the horizontal axis) of the region 8 represents time symbols, and the second axis (i.e. the vertical axis) of the region 8 represents frequency bands. Similar to the frame 3 in the first embodiment, the resource allocation of each allocation (i.e. a burst) in the region 8 is represented as a 2D coordinate. In this embodiment, an allocation is a time-frequency rectangular which is allocated either for transmission to some receivers, receiving from some transmitters, null allocation, or other usages and is not used to limit the scope of the present invention.

The region 8 comprises a mapping message field 80 (such as a MAP in the IEEE 802.16 standard), a plurality of sub-regions (i.e. zones) 81, 82, 83, 84, and a plurality of sub-regions (i.e. zones) 85, 86. In this embodiment, the region 8 is divided into sub-regions 81, 82, 83, 84 with respect to time symbols, and is divided into regions 85, 86 with respect to frequency bands.

The viewpoints from the regions of the region 8 are explained firstly. The sub-region 81 comprises a plurality of allocations (bursts) 810, 812, 814, 816, 818. The sub-region 82 is not allocated for any burst. The sub-regions 83, 84 are considered as one single logical region 88, which comprises a plurality of allocations 830, 832, 834, 836, 838, 840, 842.

The predetermined transmission sequence in this embodiment is from the sub-region 81, the sub-region 82 to the logical region 88. The predetermined transmission sequence in sub-region 81 is the allocation 810, the allocation 812, the allocation 814, the allocation 816, and the allocation 818. The predetermined transmission sequence in logical region 88 is the allocation 830, the allocation 832, the allocation 834, the allocation 836, the allocation 838, and the allocation 840, the allocation 842.

Similar to the above embodiments, the mapping module 211*b* of the transmission station 211 writes a region IE (i.e. a zone IE) of the sub-region 81 into the mapping message field 80. Then, the mapping module 211*b* writes a start of the beginning allocation (i.e. the allocation 810) into the mapping message field. Then, the IEs of the allocations (i.e. bursts) 810, 812, 814, 816, 818 are written into the mapping message field 80 by the mapping module 211*b* according to the predetermined transmission sequence. Then, the mapping module 211*b* writes a region IE of the logical region 88, a start of the beginning burst in the logical region 88, and then the IEs of the allocations 830, 832, 834, 836, 838, 840, 842 into the mapping message field 80 according to the predetermined transmission sequence.

Specifically, the content of the IE for the burst 810 is (ID1, L81, W81), where ID1 is the connection or station identification of the allocation 810, the first parameter L81 is the number of the time units occupied by the burst 810, and the second parameter W81 is the number of the frequency bands occupied by the burst 810. Similarly, the content of the IEs for the burst 812, 814, 816, 818, 830, 832, 834, 836, 838, 840, 842 are (ID2, L82, W82), (ID3, L83, W83), (ID4, L84, W84), (ID5, L85, W85), (ID6, L86, W86), (ID7, L87, W87), (ID8, L88, W88), (ID9, L89, W89), (ID10, L810, W810), (ID11, L811, W811), and (ID12, L812, W812), respectively. The identities ID2, ID3, ID4, ID5, ID6, ID7, ID8, ID9, ID10, ID11, and ID12 are the identities of destination stations to receive the allocations 812, 814, 816, 818, 830, 832, 834, 836, 838, 840, 842, respectively. The first parameters L82, L83, L84, L85, L86, L87, L88, L89, L810, L811, and L812 are the numbers of the time units occupied by the burst 812, 814, 816, 818, 830, 832, 834, 836, 838, 840, 842, respectively. The parameters W82, W83, W84, W85, W86, W87, W88, W89, W810, W811, and W812 are the numbers of the frequency bands occupied by the allocations 812, 814, 816, 818, 830, 832, 834, 836, 838, 840, 842, respectively.

Destination stations that intends to receive the allocations 810, 812, 814, 816, 818, 830, 832, 834, 836, 838, 840, 842 can calculates the start 811, 813, 815, 817, 819, 831, 833, 835, 837, 839, 841, 843 of the allocations 810, 812, 814, 816, 818, 830, 832, 834, 836, 838, 840, 842 in the similar way described in the previous embodiments. Destination stations can also extracts the allocations 810, 812, 814, 816, 818, 830, 832, 834, 836, 838, 840, 842 in the similar way described in the previous embodiments.

In this way, the resource allocation of each allocation in the region is defined by only two parameters: number of time units and number of frequency bands in the MAP. Compared with the conventional technique, the region of the present invention saves two parameters to define the resource allocation of the burst.

Figure 8:
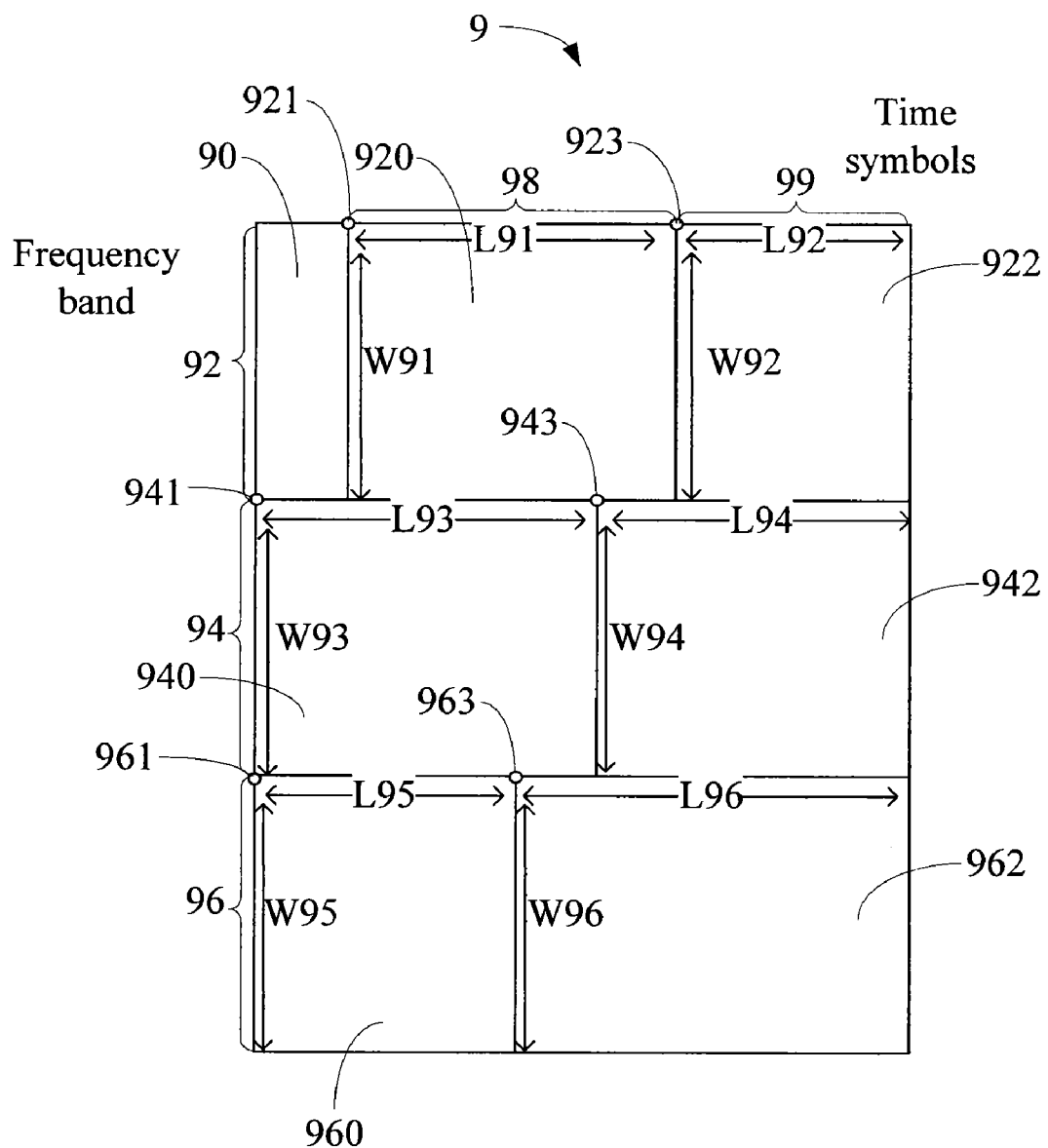
FIG. 8 is a schematic diagram of a frame constructed by a sixth embodiment.

FIG. 8 illustrates a schematic view of a frame 9 constructed by a sixth embodiment of the present invention. The sixth embodiment can be realized by the transmission station 211. In the sixth embodiment, the frame 9 is defined by a first axis (i.e. the horizontal axis) of the frame 9 represents time symbols, and the second axis (i.e. the vertical axis) of the frame 9 represents frequency bands. Similar to the frame 3 in the first embodiment, the resource allocation of each burst in the frame 9 is represented as a 2D coordinate (time, frequency). The similarity between the frame 3 and the frame 9 are not repeated again, and only the differences between them are described.

The frame 9 comprises a mapping message field 90 and a plurality of regions (i.e. zones) 92, 94, 96. It is noted that the part of the vertical axis respectively occupied by the regions 92, 94, 96 in the frame 9 are the same, which means the numbers of the frequency bands occupied by the regions 92, 94, 96 are the same. The region 92 comprises the allocations 920, 922, the region 94 comprises the allocation 940, 942, and the region 96 comprises the allocation 960, 962. The allocations have similar definitions as that described in the fifth embodiment, so are not repeated again.

The predetermined transmission sequence of this embodiment is region 92, 94, and then 96 in the frame 9. The predetermined transmission sequence is allocation 920, 922 in the region 92, burst 940, 942 in the region 94, and burst 960, 962 in the region 96. The mapping module 211*b* of the transmission station 211 writes the zone IEs of the region 92 into the mapping message field 90, a start of the beginning allocation (i.e. the allocation 920) of the region 92, the IEs of the allocations 920, 922 according to the predetermined transmission sequence, a start of the beginning allocation (i.e. the allocation 940) of the region 94, the IEs of the allocations 940, 942 according to the predetermined transmission sequence, a start of the beginning allocation (i.e. the allocation 960) of the region 96, and IEs of the allocations 960, 962 according to the predetermined transmission sequence into the mapping message field 90.

The IEs of the allocations 920, 922, 940, 942, 960, 962 are respectively (ID1, L91, W91), (ID2, L92, W92), (ID3, L93, W93), (ID4, L94, W94), (ID5, L95, W95), and (ID6, L96, W96). These parameters have similar meanings as those described in the previous embodiments, so are not repeated. It is noted that the second parameters W90, W91, W92, W93, W94, W95, W96 have the same value in this embodiment because the regions 92, 94, 96 have the same number of frequency bands. Therefore, it requires only one parameter in order to calculate a start of each of the bursts.

The destination stations that intend to receive the allocations 920, 922, 940, 942, 960, 962 can calculate the starts 921, 923, 941, 943, 961, 963 by the similar way as described in the previous embodiments. The destination stations can extracts the allocations 920, 922, 940, 942, 960, 962 by the similar way as described in the previous embodiments. The details are not repeated.

Figure 9:
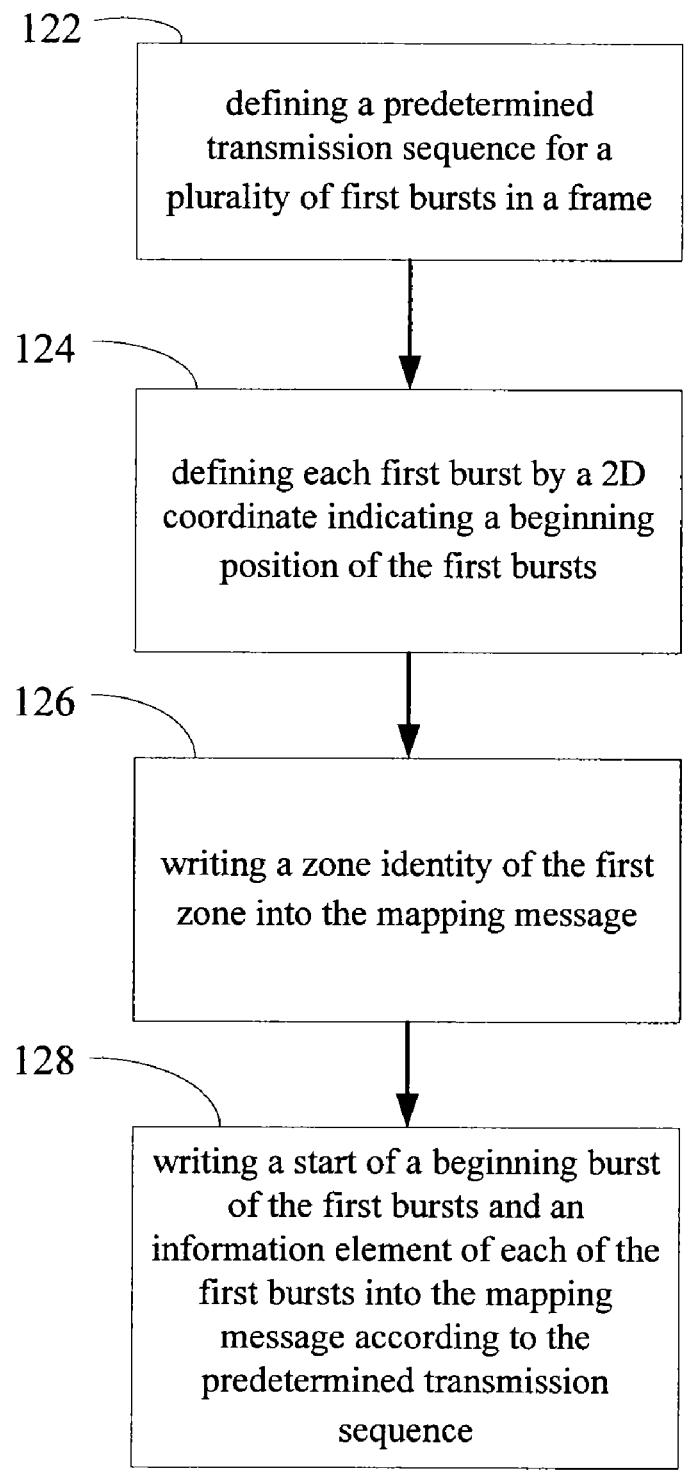
FIG. 9 is a flowchart of a seventh embodiment of the invention.

A seventh embodiment of the present invention is a method for constructing a frame for a wireless station, such as the transmission station 211. The flow chart of the seventh embodiment is shown in FIG. 9. First, Step 122 is executed to define a predetermined transmission sequence for a plurality of first bursts in a frame. Step 124 is executed to define each first burst by a 2D coordinate indicating a beginning position of the first bursts, wherein each of the 2D coordinates comprises a first coordinate value related to the first axis and a second coordinate related to the second axis, the predetermined transmission sequence is arranging the first bursts by ordering the first coordinate values first and then ordering the second coordinate values. Step 126 is executed to write a zone identity of the first zone into the mapping message field. Step 128 is executed to write a start of a beginning burst of the first bursts and an information element of each of the first bursts into the mapping message field according to the predetermined transmission sequence. In addition, each IE of the second bursts comprises an identity of a destination to receive the second burst and a first parameter and a second parameter of the second burst, the first parameter of the second burst is related to the first axis and the second parameter of the second burst is related to the second axis.

Furthermore, if the frame comprises the first zone and a second zone, the first zone comprises the first bursts, the second zone comprises a plurality of second bursts, Step 122 is further executed to define the predetermined transmission sequence for the second bursts in the second zone. Step 124 is further executed to define each second burst by a 2D coordinate indicating a beginning position of the second bursts. Step 126 is further executed to write a zone identity of the second zone into the mapping message field. Step 128 is further executed to write a start of a beginning burst of the second bursts and an IE of each of the second bursts into the mapping message field according to the predetermined transmission sequence.

Figure 10:
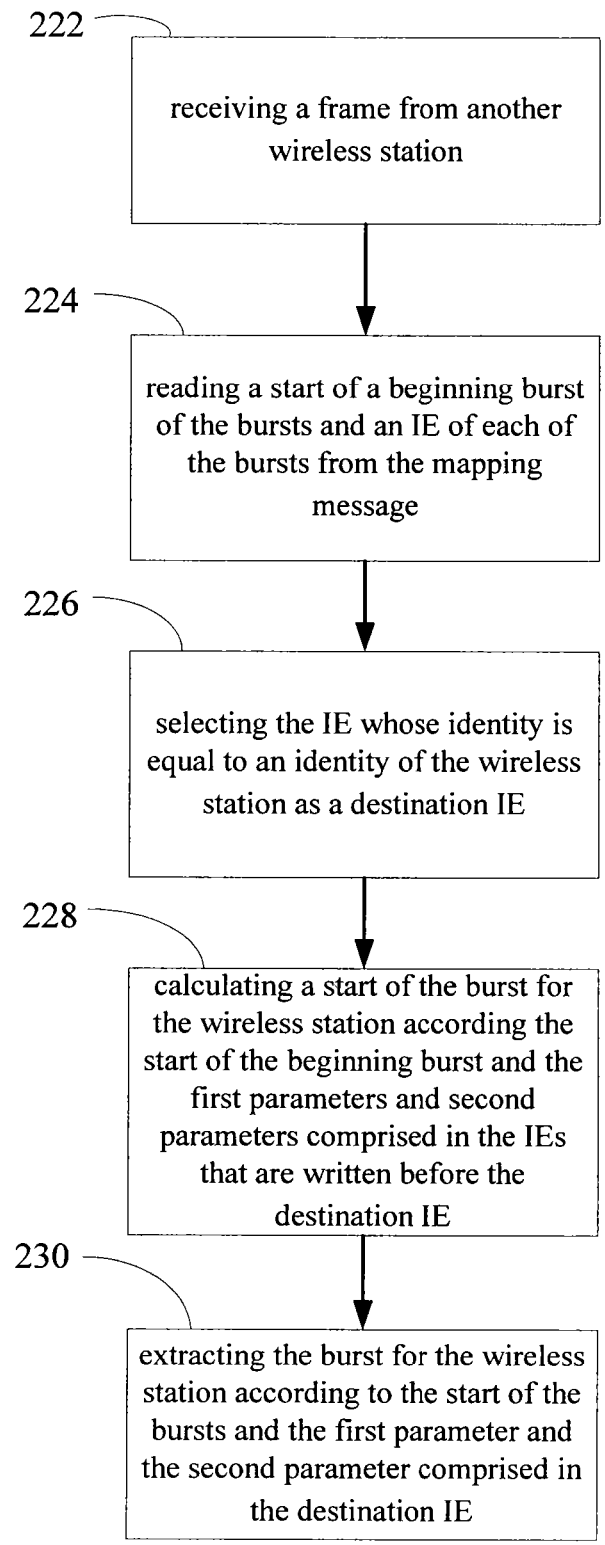
FIG. 10 is a flowchart of an eighth embodiment of the invention.

An eighth embodiment of the present invention is a method whose flow chart is shown in FIG. 10. The method adapted to a wireless station, more specifically a destination station, comprises the following steps. First, step 222 is executed to receive a frame from another wireless station, wherein the frame comprises a mapping message field and a plurality of bursts. Step 224 is executed to read a start of a beginning burst of the bursts and an IE of each of the bursts from the mapping message field, wherein each IE comprise an identity and a first parameter and a second parameter of the corresponding burst, the first parameter is related to the first axis and the second parameter is related to the second axis. Step 226 is executed to select the IE whose identity is equal to an identity of the wireless station as a destination IE. Step 228 is executed to calculate a start of the burst for the wireless station according the start of the beginning burst and the first parameters and second parameters comprised in the IEs that are written before the destination IE. More specifically, the Step 228 is executed to calculate the start of the burst for the wireless station by summing up the first parameter of the start of the beginning burst and the first parameters of the IEs that are written before the destination IE and summing up the second parameter of the start of the beginning burst and the second parameters of the IEs that are written before the destination IE. Step 230 is executed to extract the burst for the wireless station according to the start of the bursts and the first parameter and the second parameter comprised in the destination IE.

In addition to the aforementioned steps, the seventh embodiment and eighth embodiment can execute all operations of the transmission stations 211 and the receiving station 231 addressed in the aforementioned embodiments. People who are ordinary skilled in the art can understand corresponding steps or operations of the fifth embodiment according to explanations of the aforementioned embodiments and thus no unnecessary details is given here.

The above-mentioned methods may be implemented via an application program which stored in a computer readable medium. The computer readable medium can be a floppy disk, a hard disk, an optical disc, a flash disk, a tape, a database accessible from a network or any storage medium with the same functionality that can be easily thought by people skilled in the art.

The present invention provides a frame transmitted between the stations in the wireless network. The resource allocation of each allocation in the frame is defined by only two parameters: number of time units and number of frequency bands. Compared with the conventional technique, the frame of the present invention saves two parameters to define the resource allocation of the allocation. The present can decrease the extra loads in transmitting and the extra costs of the wireless network effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless station, comprising:
   a storage module, being configured to store a predetermined transmission sequence for a plurality of first bursts in a frame, wherein the frame is defined by a first axis and a second axis and the frame comprises the first bursts and a mapping message field; and
   a mapping module, being coupled to the storage module and configured to write a start of a beginning burst of the first bursts and an information element (IE) of each of the first bursts into the mapping message field according to the predetermined transmission sequence,
   wherein each IE comprises an identity of a destination station to receive the first burst and a first parameter and a second parameter of the first burst, the first parameter is related to the first axis, and the second parameter is related to the second axis and wherein each first burst is defined by a 2D coordinate indicating a beginning position of the first bursts, each of the 2D coordinates comprises a first coordinate value related to the first axis and a second coordinate related to the second axis, the predetermined transmission sequence is arranging the first bursts by ordering the first coordinate values first and then ordering the second coordinate values.

2. The wireless station as claimed in claim 1, wherein the start of the beginning burst is defined by a first parameter and a second parameter of the beginning burst, the first parameter of the beginning burst is related to the first axis, and the second parameter of the beginning burst is related to the second axis.

3. The wireless station as claimed in claim 1, wherein the first axis represents OFDMA symbols and the second axis represents frequency bands.

4. The wireless station as claimed in claim 3, wherein the first parameter that defines the start is an OFDMA symbol offset and the second parameter that defines the start is a frequency band offset.

5. The wireless station as claimed in claim 3, wherein each first burst occupies a number of the OFDMA symbols and a number of frequency bands, the first parameter and the second parameter of each first burst are respectively the number of the OFDMA symbols and the number of the frequency bands occupied by the first burst.

6. The wireless station as claimed in claim 3, wherein each first burst corresponds to a 2D coordinate indicating an ending position of the first burst, the first parameter and the second parameter of each first burst form the 2D coordinate indicating the ending position.

7. The wireless station as claimed in claim 1, wherein the frame comprises a first zone and a second zone, the first zone comprises the first bursts, the second zone comprises a plurality of second bursts, the predetermined transmission sequence is further for the second bursts in the second zone, the mapping module is further configured to write a start of a beginning burst of the second bursts and an IE of each of the second bursts into the mapping message field according to the predetermined transmission sequence, each IE of the second bursts comprises an identity of a destination to receive the second burst and a first parameter and a second parameter of the second burst, wherein the first parameter of the second burst is related to the first axis and the second parameter of the second burst is related to the second axis.

8. The wireless station as claimed in claim 7, wherein the mapping module further writes a zone information element (zone IE) of the first zone before the start of the beginning burst of the first bursts and a zone IE of the second zone before the start of the beginning burst of the second bursts.

9. The wireless station as claimed in claim 7, wherein the first zone is a downlink (DL) access zone and the second zone is a DL relay zone.

10. The wireless station as claimed in claim 1, further comprising a transmitting module being coupled to the mapping module and configured to transmit the frame.

11. A wireless station, comprising:
a receiving module, being configured to receive a frame from another wireless station, wherein the frame comprises a mapping message field and a plurality of bursts;
an information reading module, being coupled to the receiving module and configured to read a start of a beginning burst of the bursts and an IE of each of the bursts from the mapping message field, wherein each IE comprise an identity and a first parameter and a second parameter of the corresponding burst, the first parameter is related to the first axis and the second parameter is related to the second axis;
a calculating module, being coupled to the information reading module and configured to select the IE whose identity is equal to an identity of the wireless station as a destination IE and calculate a start of the burst for the wireless station according the start of the beginning burst and the first parameters and second parameters comprised in the IEs that are written before the destination IE; and
a burst extracting module, being coupled to the calculating module and the receiving module and configured to extract the burst for the wireless station according to the start of the bursts and the first parameter and the second parameter comprised in the destination IE,
wherein the first axis represents OFDMA symbols and the second axis represents frequency bands, a first parameter of the start of the beginning burst is an OFDMA symbol offset, a second parameter of the start of the beginning burst is a frequency band offset, each burst occupies a number of the OFDMA symbols and a number of frequency bands, the first parameter and the second parameter of each burst are the number of the OFDMA symbols and the number of the frequency bands respectively, the calculating module calculates the start of the burst for the wireless station by summing up the first parameter of the start of the beginning burst and the first parameters of the IEs that are written before the destination IE and summing up the second parameter of the start of the beginning burst and the second parameters of the IEs that are written before the destination IE.

12. A frame constructing method for use in a wireless station, comprising the steps of:
(a) defining a predetermined transmission sequence for a plurality of first bursts in a frame, wherein the frame is defined by a first axis and a second axis and the frame comprises the first bursts and a mapping message field;
(b) writing a start of a beginning burst of the first bursts into the mapping message field; and
(c) writing an IE of each of the first bursts into the mapping message field according to the predetermined transmission sequence after the step (b), each IE comprising an identity of a destination station to receive the first burst and a first parameter and a second parameter of the first burst, the first parameter is related to the first axis, and the second parameter is related to the second axis: and
(d) defining a 2D coordinate for each of the first bursts, each of the 2D coordinate indicating a beginning position of the first bursts it defined, wherein each of the 2D coordinates comprises a first coordinate value related to the first axis and a second coordinate related to the second axis, the predetermined transmission sequence is arranging the first bursts by ordering the first coordinate values first and then ordering the second coordinate values.

13. The frame constructing method as claimed in claim 12, further comprising the step of: defining the start of the beginning burst by a first parameter and a second parameter of the beginning burst, wherein the first parameter of the beginning burst is related to the first axis, and the second parameter of the beginning burst is related to the second axis.

14. The frame constructing method as claimed in claim 12, wherein the first axis represents OFDMA symbols and the second axis represents frequency bands.

15. The frame constructing method as claimed in claim 14, wherein the first parameter that defines the start is an OFDMA symbol offset and the second parameter that defines the start is a frequency band offset.

16. The frame constructing method as claimed in claim 14, wherein each first burst occupies a number of the OFDMA symbols and a number of frequency bands, the first parameter and the second parameter of each first burst are respectively the number of the OFDMA symbols and the number of the frequency bands occupied by the first burst.

17. The frame constructing method as claimed in claim 14, wherein each first burst corresponds to a 2D coordinate indicating an ending position of the first burst, the first parameter and the second parameter of each first burst form the 2D coordinate indicating the ending position.

18. The frame constructing method as claimed in claim 12, wherein the frame comprises a first zone and a second zone, the first zone comprises the first bursts, the second zone comprises a plurality of second bursts, the method further comprising the steps of:
(e) defining the predetermined transmission sequence for the second bursts in the second zone; and
(f) writing a start of a beginning burst of the second bursts into the mapping message field after the step (c); and
(g) writing an IE of each of the second bursts into the mapping message field according to the predetermined transmission sequence after the step
wherein each IE of the second bursts comprises an identity of a destination to receive the second burst and a first parameter and a second parameter of the second burst, the first parameter of the second burst is related to the first axis and the second parameter of the second burst is related to the second axis.

19. The frame constructing method as claimed in claim 18, further comprising the steps of: writing a zone IE of the first zone before the step (b); and writing a zone IE of the second zone before the step (f).

20. The frame constructing method as claimed in claim 18, wherein the first zone is a downlink (DL) access zone and the second zone is a DL relay zone.

21. A frame reading method for use in a wireless station, comprising the steps of:

receiving a frame from another wireless station, wherein the frame comprises a mapping message field and a plurality of bursts;

reading a start of a beginning burst of the bursts and an IE of each of the bursts from the mapping message field, wherein each IE comprise an identity and a first parameter and a second parameter of the corresponding burst, the first parameter is related to the first axis and the second parameter is related to the second axis;

selecting the IE whose identity is equal to an identity of the wireless station as a destination IE;

calculating a start of the burst for the wireless station according the start of the beginning burst and the first parameters and second parameters comprised in the IEs that are written before the destination IE by summing up the first parameter of the start of the beginning burst and the first parameters of the IEs that are written before the destination IE and summing up the second parameter of the start of the beginning burst and the second parameters of the IEs that are written before the destination IE; and extracting the burst for the wireless station according to the start of the bursts and the first parameter and the second parameter comprised in the destination IE, wherein the first axis represents OFDMA symbols and the second axis represents frequency bands, a first parameter of the start of the beginning burst is an OFDMA symbol offset, a second parameter of the start of the beginning burst is a frequency band offset, each burst occupies a number of the OFDMA symbols and a number of frequency bands, the first parameter and the second parameter of each burst are the number of the OFDMA symbols and the number of the frequency bands respectively.

* * * * *